No. 795,325. PATENTED JULY 25, 1905.
D. L. WINTERS.
GALVANIC BATTERY.
APPLICATION FILED NOV. 2, 1904.
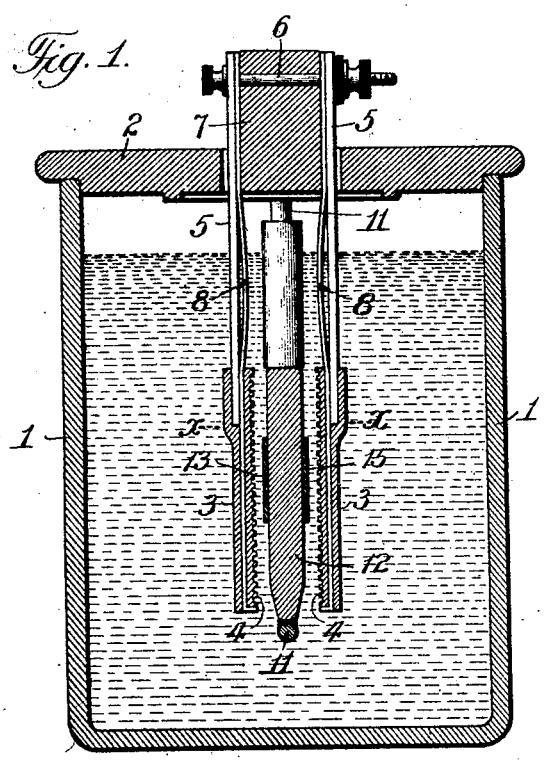
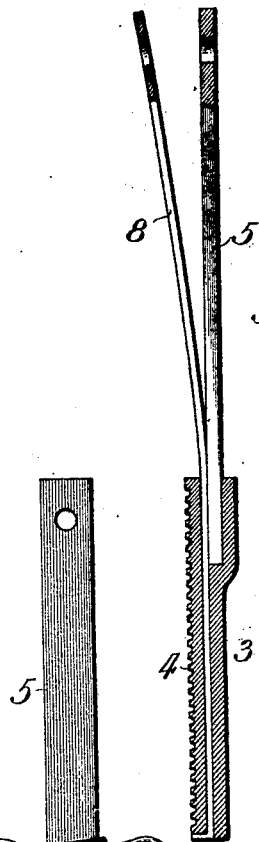
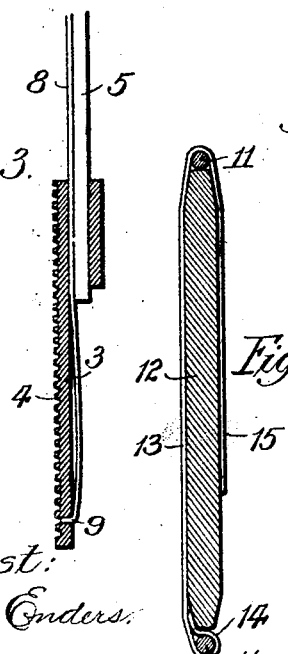
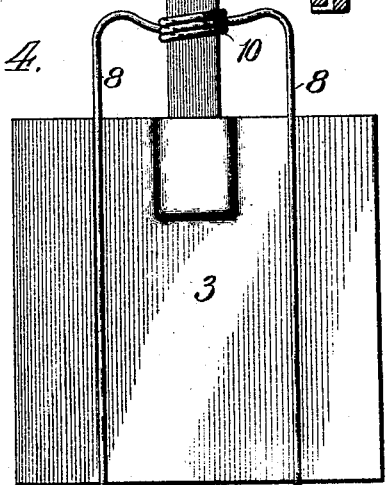
Attest:
John Enders.
M. H. Holmes.
Inventor:
David L. Winters,
by Robert Burns
Attorney.

UNITED STATES PATENT OFFICE.

DAVID L. WINTERS, OF CHICAGO, ILLINOIS.

GALVANIC BATTERY.

No. 795,325.

Specification of Letters Patent.

Patented July 25, 1905.

Application filed November 2, 1904. Serial No. 231,066.

*To all whom it may concern:*

Be it known that I, DAVID L. WINTERS, a citizen of the United States of America, and a resident of Chicago, in the county of Cook and State of Illinois, have invented certain new and useful Improvements in Galvanic Batteries, of which the following is a specification.

This invention relates to galvanic batteries, and more especially to that type of such batteries which constitutes the subject-matter of my prior Letters Patent, No. 734,646, dated July 28, 1903, and No. 744,989, dated November 24, 1903; and the present improvement has for its object to provide a simple and efficient structural arrangement and combination of parts by means of which a local short circuit is automatically formed in an individual cell when the disintegration or erosion of the positive or zinc element has reached a predetermined stage.

In the accompanying drawings, Figure 1 is a vertical section of a galvanic battery, illustrating the general arrangement of the present invention. Fig. 2 is a detail vertical section showing the preferred construction of the positive electrode. Fig. 3 is a similar view of a modified construction of the same. Fig. 4 is a rear elevation of the positive electrode, illustrating another modification. Fig. 5 is a detail horizontal section at line $xx$, Fig. 1, illustrating the holding-clip for the negative electrode.

Similar numerals of reference indicate like parts in the several views.

Referring to the drawings, 1 represents the battery-cell, having the usual removable cover 2, from which the positive and negative electrodes of the battery are suspended, as usual.

3 is the positive electrode, preferably of a rectangular-plate form, as shown, and which is preferably formed with a series of small and closely-adjacent projections 4 in its surface, which is in apposition to the negative electrode, the purpose being to prevent the usual scaling off which takes place from the ordinary flat surface of a zinc electrode and the tendency of such scale to contact with the negative electrode to form one or more injurious short-circuits between the electrodes.

5 is a supporting-bar extending up from the positive electrode and provided with the usual orifice at its upper end for supporting engagement with a bolt 6, passing horizontally through a central lug or boss 7 on the top surface of the cover 2, as usual in primary batteries.

8 is a resilient member secured in adjacent parallel relation to the positive electrode and its supporting-bar. The normal tendency of said resilient member is to spring away at its lower end from its above-mentioned parallel position and by contact with the negative electrode form a short circuit between the battery-electrodes. Such tendency in the present invention is restrained by an engagement of the lower and free end of such resilient member with the positive electrode. With such arrangement a disintegration and consequent weakening of such electrode by actual use must take place before such resilient member can tear loose to move into contact with the negative electrode or its holder and automatically form a short circuit between the two poles of the battery-cell.

Various structural arrangements of the parts may be employed to obtain the above-mentioned results without departing from the scope of the present invention. In the preferred arrangement, as shown in Figs. 1 and 2, the aforesaid resilient member is in the form of a curved bar placed in contact with the electrode-supporting bar 5 and cast therewith in the main body of the cast zinc electrode 3. In such arrangement the proper resiliency is imparted to the bar or member 8 in the initial operation of connecting the positive electrode to the battery-cover.

In Fig. 3 the supporting and resilient bars 5 and 8 are shown as independent parts passing down through a vertical slot in the positive electrode and held in place by the resiliency of the bar 8. Independent vertical movement of the electrode upon said bars is prevented by an angular toe or projection 9 on the lower end of the resilient bar 8 having engagement in a recess or socket in the electrode, as shown.

In Fig. 4 the resilient member aforesaid is shown in the form of a pair of depending bars or tines connected together at top and provided with a central coiled eye 10, adapted to engage around the attaching shank or bar of the positive electrode to secure such resilient member in position.

11 is the usual stirrup-shaped frame depending from the cell-cover 2 and adapted to support the negative electrode 12 of the battery.

13 is a holding-clip for securing the electrode 12 in place in the frame 11 in a readilyremovable manner. In the construction shown such clip consists of a single plate or bar of resilient material bent upon itself to form a flattened open-sided loop adapted to embrace the vertical members of the supporting-frame of the negative electrode. Such loop is secured at one end of said vertical frame members by a folded eye 14 or other equivalent means, while its other end is left free to form a spring-tongue 15, under which the electrode is inserted and held, as illustrated in Fig. 5.

Having thus fully described my said invention, what I claim as new, and desire to secure by Letters Patent, is—

1. A galvanic battery comprising a containing-cell, positive and negative electrodes, supporting means for said electrodes, and a circuit-closing member attached at its upper end to the supporting means of the positive electrode to depend into the electrolyte and adapted upon the disintegration of the positive electrode to move into contact with the negative electrode and effect a short circuit in the cell, substantially as set forth.

2. A galvanic battery comprising a containing-cell, positive and negative electrodes, supporting means for said electrodes, and a resilient circuit-closing member attached at its upper end to the supporting means of the positive electrode to depend into the electrolyte and adapted upon the disintegration of the positive electrode to move into contact with the negative electrode and effect a short circuit in the cell, substantially as set forth.

3. In a galvanic battery, the combination of a battery-cell, positive and negative electrodes, means for supporting the electrodes in said cell, and a resilient contact member connected to the positive electrode and adapted upon the disintegration of such electrode to break away from the same and by contact with the negative electrode or its connections form a short circuit in the battery-cell, the same comprising a resilient bar arranged in vertical and parallel relation to the positive electrode and its supporting-bar and secured in position by embedment in the body of the electrode, substantially as set forth.

Signed at Chicago, Illinois, this 28th day of October, 1904.

DAVID L. WINTERS.

Witnesses:
ROBERT BURNS,
M. H. HOLMES.